United States Patent Office 3,318,879
Patented May 9, 1967

3,318,879
2-OXYGENATED-1,2,4-BENZOTHIADIAZINE 1,1-DIOXIDES
Peter H. L. Wei, Upper Darby, and Stanley C. Bell, Philadelphia, Pa., assignors to American Home Products Corporation, New York, N.Y., a corporation of Delaware
No Drawing. Filed Feb. 14, 1964, Ser. No. 344,843
9 Claims. (Cl. 260—243)

This invention is concerned with compositions of matter classified in the art of organic chemistry as substituted benzothiadiazines.

The invention sought to be patented, in its principal composition aspect, resides in the concept of a composition of matter being a chemical compound having a molecular structure in which there is attached to the 2-position of the 1,2,4-benzothiadiazine 1,1-dioxide nucleus a hydroxy group or its hereinafter disclosed equivalents.

The invention sought to be patented, in a second composition aspect, resides in the concept of a composition of matter being a chemical compound having a molecular structure in which there is attached to the 2-position of 1,2,4-benzothiadiazin-3(4H)-one 1,1-dioxide the hydroxy group or its hereinafter disclosed equivalents.

The invention sought to be patented, in a first process aspect, resides in the sequence of reactions including forming a 2-aminobenzenesulfonhydroxamic acid and condensing this acid with an aldehyde or a ketone to form a 2-hydroxy-3,4-dihydro-2H-1,2,4-benzothiadiazine 1,1-dioxide.

The invention sought to be patented, in a second process aspect, resides in the concept of the sequence of reactions including forming a 2-aminobenzenesulfonhydroxamic acid and condensing this acid with phosgene to form a 2-hydroxy - 2H - 1,2,4-benzothiadiazin-3(4H)-one 1,1-dioxide.

The tangible embodiments of the composition aspect of the invention possess the inherent general physical properties of being relatively high melting, white solids; are substantially insoluble in water and are soluble in polar solvents, such as lower aliphatic alcohols. Examination of the compounds produced according to the hereinafter described processes reveals, upon infrared and ultraviolet examination, spectral data confirming the molecular structure hereinabove set forth. The aforementioned physical characteristics, taken together with the nature of the starting materials and the modes of synthesis, positively confirm the structures of the compositions sought to be patented.

The tangible embodiments of the invention possess the inherent applied use characteristics of exerting qualitatively varying psycholeptic effects, as evidenced by pharmacological evaluation according to standard procedures. Thus, tangible embodiments show depressant, mydriatic, and anticonvulsant effects.

The new processes of this invention are each illustrated schematically for specific embodiments thereof in Schemes A and B, and more generally in Schemes A' and B', to which the numerals in parentheses in the following description refer.

SCHEME A

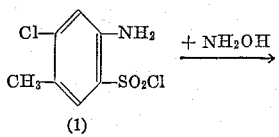

(1)

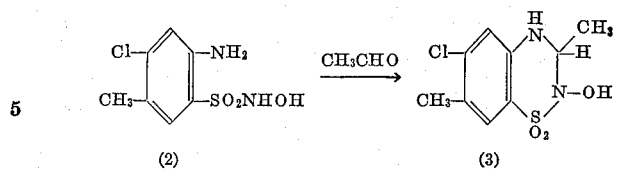

SCHEME A'

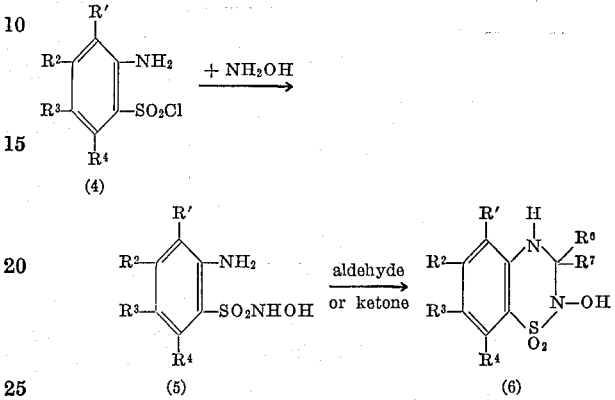

The benzenesulfonyl chlorides (1) (4) employed in making the starting products for the invention are generally known or are readily prepared by methods known to those skilled in the art of chemistry, as are the corresponding benzenesulfonyl bromides which are also suitable in the process of making aspect of this invention. The 2-aminobenzenesulfonylhydroxamic acid intermediate (2)(5) can be prepared by reacting a benzenesulfonyl chloride (1)(4) with a hydroxylamine solution containing an acid scavenger such as triethylamine. In general the reaction proceeds best over a period of about 12 hours following which the 2-amino-benzenesulfonhydroxamic acid (2)(5) is isolated by conventional techniques. This product then is dissolved in a solvent and is cyclized by heating with an aldehyde or a ketone. After a relatively short reaction time, the solvent is removed and benzene is added to the residue to precipitate the 2-hydroxy-3,4-dihydro-2H-1,2,4-benzothiadiazine 1,1-dioxide (3)(6). It will be understood that the cyclizing step can be effected with either aliphatic or aromatic aldehydes and ketones. Where the reaction is carried out with an aldehyde, which may be represented as

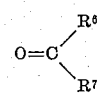

substituent $R^6$ in Scheme A' is an alkyl group such as, for example but without limitation, a methyl, ethyl, propyl or butyl group or an aryl group such as phenyl, or an aralkyl group such as benzyl or phenethyl, and $R^7$ is hydrogen. Obviously where the reaction is carried out with a ketone, $R^6$ is as above defined, but $R^7$ then can be an alkyl, aryl, or aralkyl group as just defined.

It will further be apparent from the disclosure herein that the reactions occurring in the process aspect of this invention can be carried out with any 2-aminobenzenesulfonyl chlorides and bromides and that these can have thereon various non-interferring substituents. Referring now to Scheme A', substituents $R'$, $R^2$, $R^3$ and $R^4$ can be, for example but without limitation, hydrogen, straight chain and branched (lower) alkyl from methyl to isopentyl; halogen such as chlorine or bromine, and sulfamyl. These substituents can be the same or can differ in the various positions.

When the starting compounds are substituted as hereinbefore indicated, it will be apparent to those skilled in the art that the intermediate 2-aminobenzenesulfonylhydroxamic acids and the final products will bear, correspondingly, the same substituents. Such substituted compounds are the full equivalents of the invention as particularly claimed.

The preparation of the 2-hydroxy-2H-1,2,4-benzothiadiazin-3(4H)-one, 1,1-dioxide is shown in Schemes B and B', to which the numbers in parentheses refer,

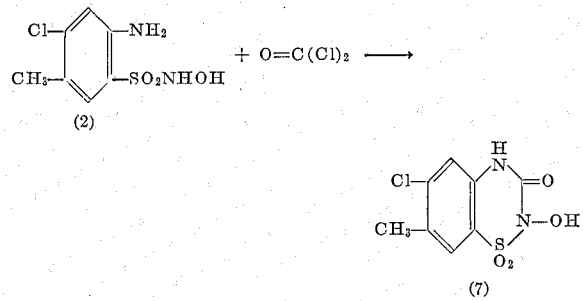

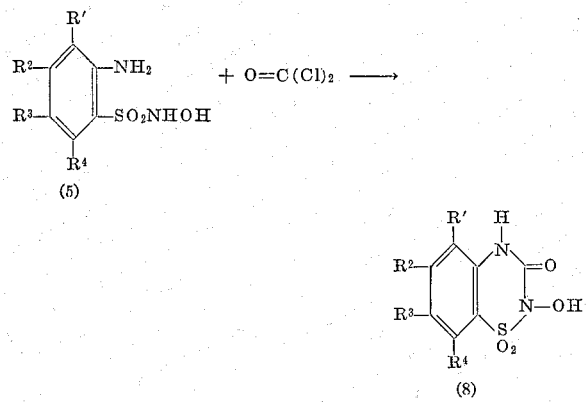

As illustrated in the above scheme, the intermediate 2-aminobenzenesulfonhydroxamic acid (2)·(5), prepared as above described, can be reacted with phosgene to form a 2-hydroxy-2H-1,2,4-benzothiadiazin-3(4H)-one 1,1-dioxide (7)(8).

The best mode contemplated by the inventors for carrying out their invention will now be set forth as follows:

EXAMPLE 1

*6-chloro-3,7-dimethyl-2-hydroxy-3,4-dihydro-2H-1,2,4-benzothiadiazine 1,1-dioxide*

A. PREPARATION OF STARTING MATERIAL

Add a dioxane solution of 11.0 g. (0.0458 m.) of 2-amino-4-chloro-5-methylbenzenesulfonyl chloride slowly to a cold aqueous hydroxylamine hydrochloride (6.33 g. or 0.92 m.) solution containing 18.7 g. (0.185 m.) of triethylamine. Allow the solution to stand at room temperature overnight, concentrate at reduced pressure and dilute the residue with water. Collect the white solids, wash with water, and recrystallize from aqueous alcohol. The pure compound 2-amino-4-chloro-5-methylbenzenesulfonhydroxamic acid, melts at 165–167° (d.), and has depressant and anticonvulsant activity.

B. PREPARATION OF FINAL PRODUCT

Dissolve 2-amino-4-chloro-5-methylbenzenesulfonhydroxamic acid (3.0 g.) in ethanol and add gradually to the solution 3.0 g. of acetaldehyde. Heat the mixture on a steam bath for one hour and then treat with decolorizing carbon such as "Darco." Remove the solvent at reduced pressure, add benzene to the residue and collect the white solids. Recrystallize from a mixture of ethanol and cyclohexane, giving a pure product, M.P. 214–6° (d.).

The above-prepared compound was tested and found to exhibit results qualitatively indicating its effectiveness for the uses hereinbefore asserted, in particular, its anticonvulsant properties were found to be excellent. The compound can be formulated for use in the manner known to those skilled in the art of formulating pharmaceuticals, by admixing with various carriers, excipients and diluents.

We have also made the compositions constituting the invention with certain substituents, other than those hereinbefore enumerated, added to the thiadazine portion of the benzothiadiazine nucleus and have determined by pharmacological evaluation that the toxicity of and the psycholeptic activity of the composition so modified are not materially affected. Thus it will be apparent from the disclosure herein to those skilled in the art of organic chemistry that, for example but without limitation, the nitrogen in the 4-position [Schemes A, A': (3)(6)] can have a substituent which can be an alkyl or aryl group as previously defined, an acyl group such as acetyl, or hydrogen. It will also be obvious that the hydroxy group in the 2-position can be reacted further in known manner so as to replace the hydrogen thereof by an alkyl group, as above defined, by an acyl group such as acetyl, or by an amido group. Similarly, in the case of the 3-ones [Schemes B, B': (7)·(8)], the same variations can occur in the 4-position, in addition to which the oxygen in the 3-position can be replaced by a sulfur atom, for example, by heating with phosphorus pentasulfide. Such additions and variations of the molecular structure of the inventive concept herein described are, therefore, equivalents of the subject matter particularly claimed.

The following examples illustrate the methods described above and the preparation of other compositions of this invention.

EXAMPLE 2

*6-chloro-3,7-dimethyl-2-methoxy-3,4-dihydro-2H-1,2,4-benzothiadiazine 1,1-dioxide*

Suspend 6-chloro-3,7,-dimethyl-2-hydroxy-3,4-dihydro-2H-1,2,4-benzothiadiazine 1,1-dioxide (1.0 g.) in an aqueous NaOH solution (made from 1.0 g. of NaOH) in acetone. With stirring and cooling, add 1 ml. of dimethyl sulfate. Stir the mixture for one hour. Collect the insoluble material and recrystallize from benzene. The pure compound melts at 211–213° (d.).

EXAMPLE 3

*2-acetoxy-4-acetyl-6-chloro-3,7-dimethyl-3,4-dihydro-2H-1,2,4-benzothiadiazine 1,1-dioxide*

Suspend 6-chloro-3,7-dimethyl-2-hydroxy-3,4-dihydro-2H-1,2,4-benzothiadiazine 1,1-dioxide (1.0 g.) in acetic anhydride (10 ml.) and heat on a steam bath for 3 hours. Filter off any insoluble material. Decompose the acetic anhydride solution with water; extract with benzene and wash the benzene extracts with sodium carbonate solution. The pure compound, M.P. 162–3° (d.), is obtained after recrystallization from benzene.

An alternate procedure for preparing 2-acetoxy-4-acetyl-6-chloro-3,7-dimethyl-3,4-dihydro-2H-1,2,4-benzothiadiazine 1,1-dioxide is the following:

Suspend 7-chloro-3,7-dimethyl-2-hydroxy-3,4-dihydro-2H-1,2,4-benzothiadiazine 1,1-dioxide (6.0 g.) in chloroform (100 ml.) containing 25 ml. acetic anhydride. Reflux until all the solids dissolve.

Add water (50 ml.) and heat the mixture on a steam bath for ½ hour to decompose the active anhydride cool. Separate the layers. Extract the aqueous layer with chloroform. Dry the combined chloroform solution over anhydrous magnesium sulfate. Filter the drying agent and remove the chloroform under pressure. Recrystallize the oily residue with benzene.

EXAMPLE 4

*6-chloro-2-hydroxy-7-methyl-2H-1,2,4-benzothiadiazin-3(4H)-one 1,1-dioxide*

Dissolve 2 - amino - 4-chloro-5-methylbenzenesulfonhydroxamic acid (5.2 g. or 0.022 m.) in demethoxyethane and treat the solution with Darco. With stirring and cooling add dropwise a solution of 2.38 g. (0.024 m.) of phosgene in dimethoxyethane. Stir for three hours. Filter off any insoluble material. Concentrate the filtrate at reduced pressure. Treat the oily residue with benzene and collect the white solid. Recrystallize from a mixture of dimethoxyethane and benzene. The pure product melts at 205–7° (d.).

EXAMPLE 5

*2-acetoxy-6-chloro-7-methyl-2H-1,2,4-benzothiadiazin-3(4H)-one 1,1-dioxide*

Dissolve 6 - chloro - 2 - hydroxy-7-methyl-2H-1,2,4-benzothiadiazin-3(4H)-one 1,1-dioxide (2.0 g.) in 7 ml. of acetic anhydride and heat the solution on a steam bath for two hours. Remove the acetic anhydride under reduced pressure and recrystallize the residue from benzene. The pure compound melts at 209–211° C.

What is claimed is:
1. 2 - amino - 4 - chloro-5-methylbenzenesulfonhydroxamic acid.
2. 6 - chloro - 3,7 - dimethyl - 2 - hydroxy-3,4-dihydro-2H-1,2,4-benzothiadiazine 1,1-dioxide.
3. 6 - chloro - 3,7 - dimethyl - 2 - methoxy-3,4-dihydro-2H-1,2,4-benzothiadiazine 1,1-dioxide.
4. 2 - acetoxy-4-acetyl-6-chloro-3,7-dimethyl-3,4-dihydro-2H-1,2,4-benzothiadiazine 1,1-dioxide.
5. 6 - chloro - 2 - hydroxy - 7-methyl-2H-1,2,4-benzothiadiazin-3(4H)-one 1,1-dioxide.
6. 2 - acetoxy - 6 - chloro-7-methyl-2H-1,2,4-benzothiadiazin-3(4H)-one 1,1-dioxide.
7. A compound of the formula:

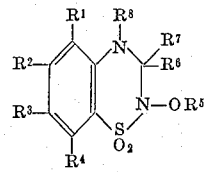

wherein $R^1$, $R^2$, $R^3$ and $R^4$ are each selected from the group consisting of hydrogen, alkyl of less than six carbon atoms, chloro and sulfamyl; $R^5$ is selected from the group consisting of hydrogen, alkyl of less than five carbon atoms and acetyl; $R^6$ is selected from the group consisting of alkyl of less than five carbon atoms, phenyl and lower alkyl phenyl; $R^7$ is selected from the group consisting of hydrogen, alkyl of less than five carbon atoms, phenyl and lower alkyl phenyl, and together $R^6$ and $R^7$ is oxo (O=); and $R^8$ is selected from the group consisting of hydrogen, acetyl, alkyl of less than six carbon atoms and phenyl.

8. The process for preparing the compounds according to claim 7 wherein $R^5$ and $R^8$ are hydrogen which comprises heating in an inert organic solvent a compound of the formula

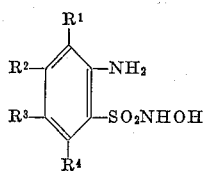

wherein $R^1$, $R^2$, $R^3$ and $R^4$ are as hereinbefore defined, with a compound of the formula

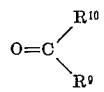

wherein $R^9$ is selected from the group consisting of hydrogen, alkyl of less than five carbon atoms, phenyl, lower alkyl phenyl and chloro; and $R^{10}$ is selected from the group consisting of alkyl of less than five carbon atoms, phenyl, lower alkyl phenyl and chloro, so as to cyclize the initial compound.

9. The compound according to claim 8 which comprises further heating the compound formed with acetic anhydride so as to form the corresponding 2-acetoxy derivative.

References Cited by the Examiner

UNITED STATES PATENTS 3,163,644  12/1964  De Stevens et al. ____ 260—243

OTHER REFERENCES

Wertheim, Textbook of Organic Chemistry, pp. 763–764, 2nd Edition, 1945.

NICHOLAS S. RIZZO, *Primary Examiner.*